United States Patent
Fukuda et al.

(10) Patent No.: US 9,920,701 B2
(45) Date of Patent: Mar. 20, 2018

(54) CONTROL DEVICE FOR INTERNAL COMBUSTION ENGINE

(71) Applicant: DENSO CORPORATION, Kariya, Aichi-pref. (JP)

(72) Inventors: Hiroyuki Fukuda, Kariya (JP); Akihiro Okamoto, Kariya (JP); Ryohei Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/027,834

(22) PCT Filed: Oct. 6, 2014

(86) PCT No.: PCT/JP2014/005074
§ 371 (c)(1),
(2) Date: Apr. 7, 2016

(87) PCT Pub. No.: WO2015/052909
PCT Pub. Date: Apr. 16, 2015

(65) Prior Publication Data
US 2016/0245202 A1 Aug. 25, 2016

(30) Foreign Application Priority Data
Oct. 8, 2013 (JP) .................................. 2013-211456

(51) Int. Cl.
*F02D 41/00* (2006.01)
*F02D 41/40* (2006.01)
(Continued)

(52) U.S. Cl.
CPC ......... *F02D 41/0085* (2013.01); *F02D 41/26* (2013.01); *F02D 41/40* (2013.01);
(Continued)

(58) Field of Classification Search
CPC ...... F02D 41/26; F02D 41/40; F02D 41/2448; F02D 41/2467; F02D 41/3845; F02D 2200/0602; Y02T 10/44; F02M 63/0225
(Continued)

(56) References Cited

U.S. PATENT DOCUMENTS 4,428,348 A * 1/1984 Takase ................... F02D 41/26
123/480
6,142,121 A * 11/2000 Nishimura ............ F02D 41/008
123/447
(Continued)

FOREIGN PATENT DOCUMENTS

JP 08-004577 1/1996
JP H084577 A * 1/1996 ....... F02D 2041/224
(Continued)

*Primary Examiner* — Hung Q Nguyen
*Assistant Examiner* — Brian Kirby
(74) *Attorney, Agent, or Firm* — Nixon & Vanderhye PC

(57) ABSTRACT

It is determined whether the execution conditions for the injection quantity variation correction are met, based on whether all of following conditions are satisfied: the engine operation is the stationary operation, the injection quantity of a fuel injection valve falls within the predetermined range, and the fuel pressure falls within the predetermined range. When the execution conditions are met, the fuel pressure decrease caused by the fuel injection of the fuel injection valve for each cylinder is calculated based on the output of a fuel pressure sensor, and the injection quantity variation correction to correct the injection quantity variation of the fuel injection valve for each cylinder is performed based on the fuel pressure decrease caused by the fuel injection of each cylinder. Thus, the fuel pressure decrease can be accurately calculated, the injection quantity variation of each cylinder is precisely corrected.

20 Claims, 4 Drawing Sheets

(51) Int. Cl.
*F02D 41/26* (2006.01)
*F02D 41/24* (2006.01)
*F02D 41/38* (2006.01)
*F02M 63/02* (2006.01)

(52) U.S. Cl.
CPC ...... *F02D 41/2448* (2013.01); *F02D 41/2467* (2013.01); *F02D 41/3845* (2013.01); *F02D 2200/0602* (2013.01); *F02M 63/0225* (2013.01); *Y02T 10/44* (2013.01)

(58) Field of Classification Search
USPC .................................................. 701/103, 104
See application file for complete search history.

(56) References Cited

U.S. PATENT DOCUMENTS

| | | | | |
|---|---|---|---|---|
| 6,192,863 | B1 * | 2/2001 | Takase | F02D 41/3809 123/357 |
| 6,244,241 | B1 * | 6/2001 | Mamiya | F02D 41/2461 123/295 |
| 6,349,702 | B1 * | 2/2002 | Nishiyama | F02D 41/3836 123/447 |
| 6,694,945 | B2 * | 2/2004 | Kawaguchi | F02D 41/0085 123/299 |
| 6,755,176 | B2 * | 6/2004 | Takeuchi | F02D 41/0085 123/299 |
| 7,980,120 | B2 * | 7/2011 | Cinpinski | F02D 41/221 701/114 |
| 2003/0164166 | A1 * | 9/2003 | Takeuchi | F02D 41/0085 123/674 |
| 2005/0092298 | A1 * | 5/2005 | Asano | F02D 41/0007 123/435 |
| 2005/0092303 | A1 * | 5/2005 | Oki | F02D 41/0087 123/480 |
| 2005/0235964 | A1 * | 10/2005 | Shibata | F02D 41/2467 123/458 |
| 2006/0107936 | A1 * | 5/2006 | Mazet | F02D 41/20 123/672 |
| 2007/0089710 | A1 * | 4/2007 | Watanabe | F02D 41/221 123/446 |
| 2008/0276906 | A1 * | 11/2008 | Thomas | F02D 41/2438 123/457 |
| 2008/0302175 | A1 * | 12/2008 | Puckett | F02D 41/221 73/114.41 |
| 2009/0164094 | A1 * | 6/2009 | Geveci | F02D 41/0087 701/103 |

FOREIGN PATENT DOCUMENTS

| | | | |
|---|---|---|---|
| JP | 09-189255 | 7/1997 | |
| JP | 2004-346852 | 12/2004 | |
| JP | 2006-063824 | 3/2006 | |
| JP | 2007-192216 | 8/2007 | |
| JP | 2010-031816 | 2/2010 | |
| JP | 2010-043614 | 2/2010 | |
| JP | 2010043614 A * | 2/2010 | ............ F02D 41/04 |
| JP | 2012-140919 | 7/2012 | |

* cited by examiner

CONTROL DEVICE FOR INTERNAL COMBUSTION ENGINE

This application is the U.S. national phase of International Application No. PCT/JP2014/005074 filed on Oct. 6, 2014 which designated the U.S. and claims priority to Japanese Patent Application No. 2013-211456 filed on Oct. 8, 2013, the entire contents of each of which are incorporated herein by reference.

CROSS REFERENCE TO RELATED APPLICATION

This application is based on Japanese Patent Application No. 2013-211456 filed on Oct. 8, 2013, the disclosure of which is incorporated herein by reference.

TECHNICAL FIELD

The present disclosure relates to a control device for an internal combustion engine which corrects an injection quantity variation in a fuel injection valve of each cylinder.

BACKGROUND ART

In a system that supplies fuel injected from a high-pressure pump to a fuel injection valve of each cylinder in an internal combustion engine, an injection quantity variation (air-to-fuel ratio variation) occurs between cylinders of the internal combustion engine. One method of correcting the variation is described in Patent Literature 1, for example. According to the method, a fuel pressure decrease caused by fuel injection of the fuel injection valve of each cylinder is calculated based on an output of a fuel pressure sensor for detecting the fuel pressure, as information on the injection quantity variation. Then, an injection pulse width of the fuel injection valve of each cylinder is corrected based on the fuel pressure decrease caused by the fuel injection of each cylinder, thereby correcting (for example, decreasing) the injection quantity variation of the fuel injection valve of each cylinder.

During a transient operation such as acceleration or deceleration of the internal combustion engine, when a required injection quantity varies with a change of the operational state of the internal combustion engine, the injection quantity of the fuel injection valve of each cylinder sequentially changes in the order of injection. Accordingly, the fuel pressure decrease caused by the fuel injection of each cylinder also changes in the order of injection. In such a case, since the fuel pressure decrease caused by the fuel injection changes due to the change of the injection quantity according to the change of the operational state of the internal combustion engine, the fuel pressure decrease caused by the fuel injection of each cylinder cannot accurately reflect the injection quantity variation of each cylinder. For this reason, in the transient operation such as acceleration or deceleration of the internal combustion engine, injection quantity variation correction to correct the injection quantity variation of the fuel injection valve of each cylinder is performed based on the fuel pressure decrease caused by the fuel injection of each cylinder. In this case, the injection quantity variation of each cylinder is not precisely corrected, which may lead to wrong correction of the injection quantity of each cylinder.

In the method described in Patent Literature 1, such a situation is not considered at all. Therefore, in the transient operation of the internal combustion engine, the fuel pressure decrease caused by the fuel injection of each cylinder cannot accurately reflect the injection quantity variation of each cylinder due to the change of the injection quantity according to the change of the operational state of the internal combustion engine. Moreover, injection quantity variation correction to correct the injection quantity variation of the fuel injection valve of each cylinder is performed based on the fuel pressure decrease caused by the fuel injection of each cylinder, which may lead to wrong correction of the injection quantity of each cylinder.

PRIOR ART LITERATURES

Patent Literature

Patent Literature 1: JP2010-43614A

SUMMARY OF INVENTION

It is an object of the present disclosure is to provide a control device for an internal combustion engine which is capable of preventing wrong correction of injection quantity of each cylinder in a system for correcting an injection quantity variation of a fuel injection valve of each cylinder.

According to an aspect of the present disclosure, a control device for an internal combustion engine is applied to a system that supplies fuel injected from a high-pressure pump to a fuel injection valve of each cylinder in the internal combustion engine via a high-pressure fuel passage. The control device for the internal combustion engine includes a fuel pressure sensor detecting a fuel pressure in the high-pressure fuel passage, and an injection quantity variation correction unit calculating a fuel pressure decrease caused by the fuel injection of the fuel injection valve for each cylinder on the basis of an output of the fuel pressure sensor, and executing an injection quantity variation correction to correct an injection quantity variation of the fuel injection valve for the each cylinder on the basis of the fuel pressure decrease caused by the fuel injection. The injection quantity variation correction unit executes the injection quantity variation correction when an operational state of the internal combustion engine is stationary.

During the stationary operation of the engine, the fuel pressure decrease caused by the fuel injection of each cylinder can accurately reflect the injection quantity variation of each cylinder without being affected by the change of the injection quantity due to the change of the engine operational state. Consequently, during the stationary operation of the engine, the injection quantity variation correction to correct the injection quantity variation of the fuel injection valve of each cylinder is performed based on the fuel pressure decrease caused by the fuel injection of each cylinder, thereby precisely correcting the injection quantity variation of each cylinder to prevent wrong correction of the injection quantity of each cylinder.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Hereafter, an embodiment of the present disclosure will be described.

Figure 1:
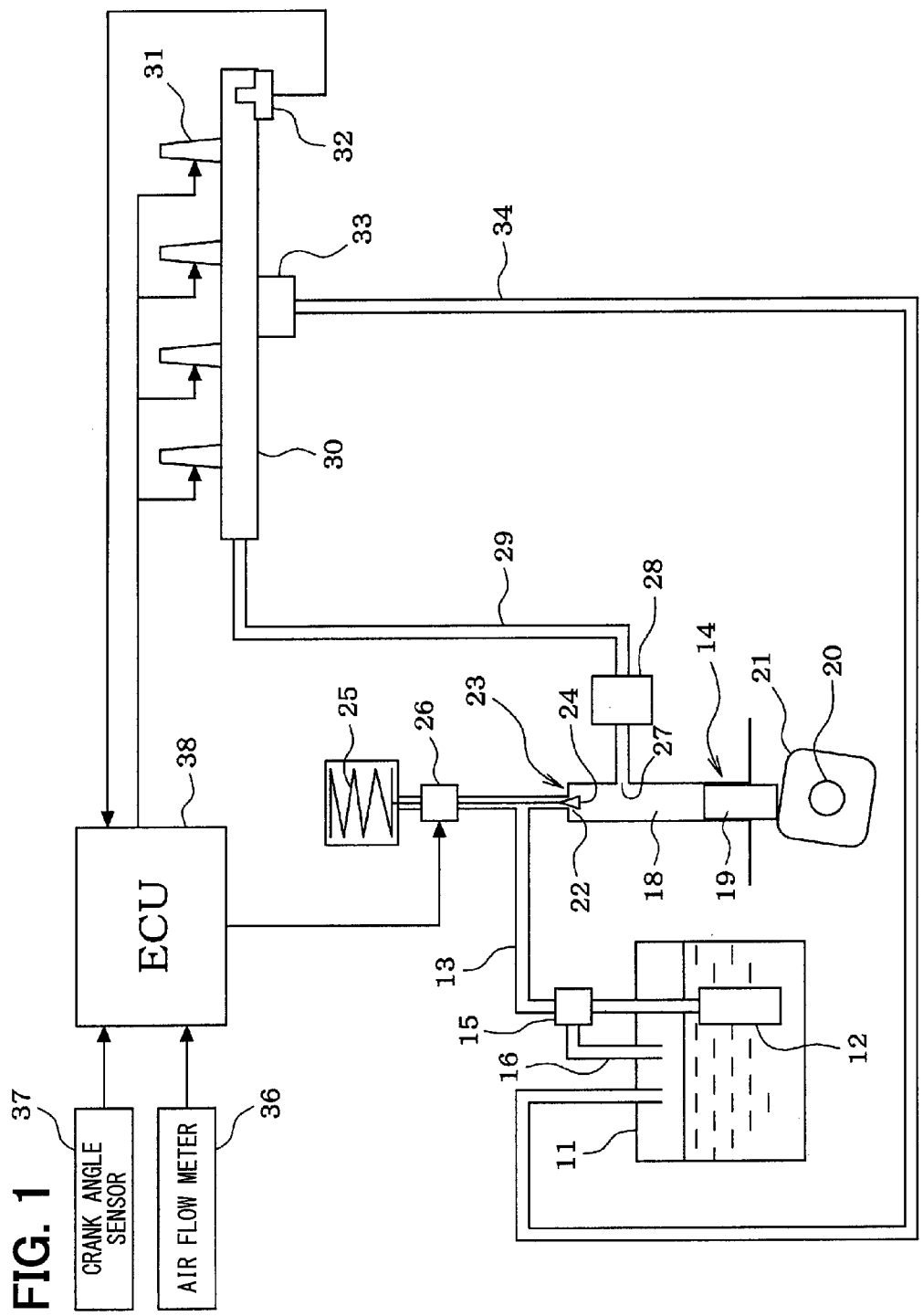
FIG. 1 is a schematic view of a configuration of a cylinder injection-type engine fuel supply system according to an embodiment of the present disclosure.

First, a schematic configuration of a cylinder injection-type engine fuel supply system will be described with reference to FIG. 1. In the embodiment, an engine corresponds to an internal combustion engine.

A low-pressure pump 12 for pumping fuel is installed in a fuel tank 11 for storing fuel. The low-pressure pump 12 is driven by an electric motor (not illustrated) receiving power from a battery (not illustrated). The fuel injected from the low-pressure pump 12 is supplied to a high-pressure pump 14 via a fuel pipe 13. A pressure regulator 15 is connected to the fuel pipe 13, and the pressure regulator 15 regulates the injection pressure of the low-pressure pump 12 to a predetermined pressure. In the case of exceeding the predetermined pressure, excess fuel is returned to the fuel tank 11 via a fuel return pipe 16. In the embodiment, the injection pressure of the low-pressure pump 12 is a pressure of fuel supplied to the high-pressure pump 14.

The high-pressure pump 14 is a piston pump that allows a piston 19 to reciprocate in a pump chamber 18 that is tubular to suction or inject fuel. The piston 19 corresponding to a plunger is driven by rotation of a cam 21 engaged with a cam shaft 20 of the engine. In the embodiment, the engine is a four-cylinder engine, and the cam 21 is a four-ridge cam having four cam ridges.

An intake port 22 of the high-pressure pump 14 is provided with a fuel pressure control valve 23. The fuel pressure control valve 23 is a normally-open electromagnetic valve, and includes a valve element 24 for opening/closing the intake port 22, a spring 25 for biasing the valve element 24 to open the valve element 24, and a solenoid 26 for electromagnetically driving the valve element 24 to close the valve element 24.

Energization of the solenoid 26 of the fuel pressure control valve 23 is controlled such that the valve element 24 of the fuel pressure control valve 23 is opened to suction fuel into the pump chamber 18 in a intake stroke of the high-pressure pump 14, and the valve element 24 of the fuel pressure control valve 23 is closed to inject fuel in the pump chamber 18 in an injection stroke of the high-pressure pump 14. An energization start time of the fuel pressure control valve 23 (the solenoid 26) is controlled, thereby controlling a closing period of the fuel pressure control valve 23 to control the injection quantity of the high-pressure pump 14, and in turn, the fuel pressure. The closing period is a crank angle interval in the closed state from a closing start time to top dead center of the piston 19. The energization start time of the fuel pressure control valve 23 is set using a crank angle from a reference crank angle position. The reference crank angle position is a crank angle position corresponding to top dead center of the piston 19. In the intake stroke of the high-pressure pump 14, the piston 19 lowers. In the injection stroke of the high-pressure pump 14, the piston 19 rises.

For example, to raise the fuel pressure, the energization start time of the fuel pressure control valve 23 is advanced to advance the closing start time of the fuel pressure control valve 23. Thus, the closing period of the fuel pressure control valve 23 is extended to increase the injection quantity of the high-pressure pump 14. To lower the fuel pressure, the energization start time of the fuel pressure control valve 23 is retarded to retard the closing start time of the fuel pressure control valve 23. Thus, the closing period of the fuel pressure control valve 23 is shortened to decrease the injection quantity of the high-pressure pump 14.

An injection port 27 of the high-pressure pump 14 is provided with a check valve 28 for preventing backflow of injected fuel. Fuel injected from the high-pressure pump 14 is sent to a delivery pipe 30 via a high-pressure fuel pipe 29. The delivery pipe 30 distributes high-pressure fuel to fuel injection valves 31 attached to respective cylinders in the engine. The delivery pipe 30 or the high-pressure fuel pipe 29 is provided with a fuel pressure sensor 32 for detecting the fuel pressure in the high-pressure fuel passages such as the high-pressure fuel pipe 29 and the delivery pipe 30. The delivery pipe 30 is further provided with a relief valve 33, and an exhaust port of the relief valve 33 is connected to the fuel tank 11 or the fuel pipe 13 on the low-pressure side via a relief pipe 34.

In the embodiment, each of the cylinders in the four-cylinder engine is provided with the fuel injection valve 31, and a four-ridge cam having four cam ridges is used as the cam 21 for driving the high-pressure pump 14. Accordingly, each time the cam shaft 20 of the engine rotates, the fuel injection valve 31 injects fuel four times and the high-pressure pump 14 also injects fuel four times. In this case, the crank shaft rotates twice.

The engine includes an air flow meter 36 for detecting quantity of suctioned air, and a crank angle sensor 37 for synchronizing the rotation of the crank shaft (not illustrated) and outputting a pulse signal every predetermined crank angle. The crank angle and engine rotation speed are detected based on an output signal of the crank angle sensor 37.

Outputs of the above-mentioned various sensors are inputted to an electronic control unit (ECU) 38. The ECU 38 is mainly constituted of a microcomputer, and executes various engine control programs stored in an incorporated ROM (storage medium) to control the fuel injection quantity, ignition time, and throttle opening (suctioned air quantity) based on the engine operational state. In the embodiment, the ECU 38 corresponds to a control device for the internal combustion engine.

The ECU 38 calculates a target fuel pressure using a map or the like based on the engine operational state such as the engine rotation speed or engine load. The ECU 38 also executes fuel pressure F/B control to F/B control the injection quantity of the high-pressure pump 14 (energization time of the fuel pressure control valve 23) such that an actual fuel pressure in the high-pressure fuel passage, which is detected by the fuel pressure sensor 32, matches the target fuel pressure. Here, "F/B" refers to "feedback".

The ECU 38 calculates a required injection quantity based on the engine operational state (for example, engine rotation speed and engine load). The ECU 38 calculates an injection pulse width that is an injection time of the fuel injection valve 31 according to the required injection quantity and the actual fuel pressure (or target fuel pressure) detected by the fuel pressure sensor 32. The ECU 38 opens the fuel injection valve 31 at the injection time to cause the fuel injection valve 31 to inject the required injection quantity of fuel.

Further, when a predetermined air-to-fuel ratio F/B control condition is met, the ECU 38 calculates main F/B correction quantity such that the air-to-fuel ratio of exhaust gas matches a target air-to-fuel ratio on the basis of an output of an exhaust gas sensor for detecting the air-to-fuel ratio or rich/lean of the exhaust gas from the engine. The exhaust gas sensor is an air-to-fuel ratio sensor, an oxygen sensor, or the like. The ECU 38 executes air-to-fuel ratio F/B control to correct the required injection quantity by using the main F/B correction quantity.

Even when the injection time of the fuel injection valves 31 of the cylinders is the same, the injection quantity of the fuel injection valves 31 of the cylinders varies due to their individual differences or aging of the fuel injection valves 31 of the cylinders.

Figure 3:
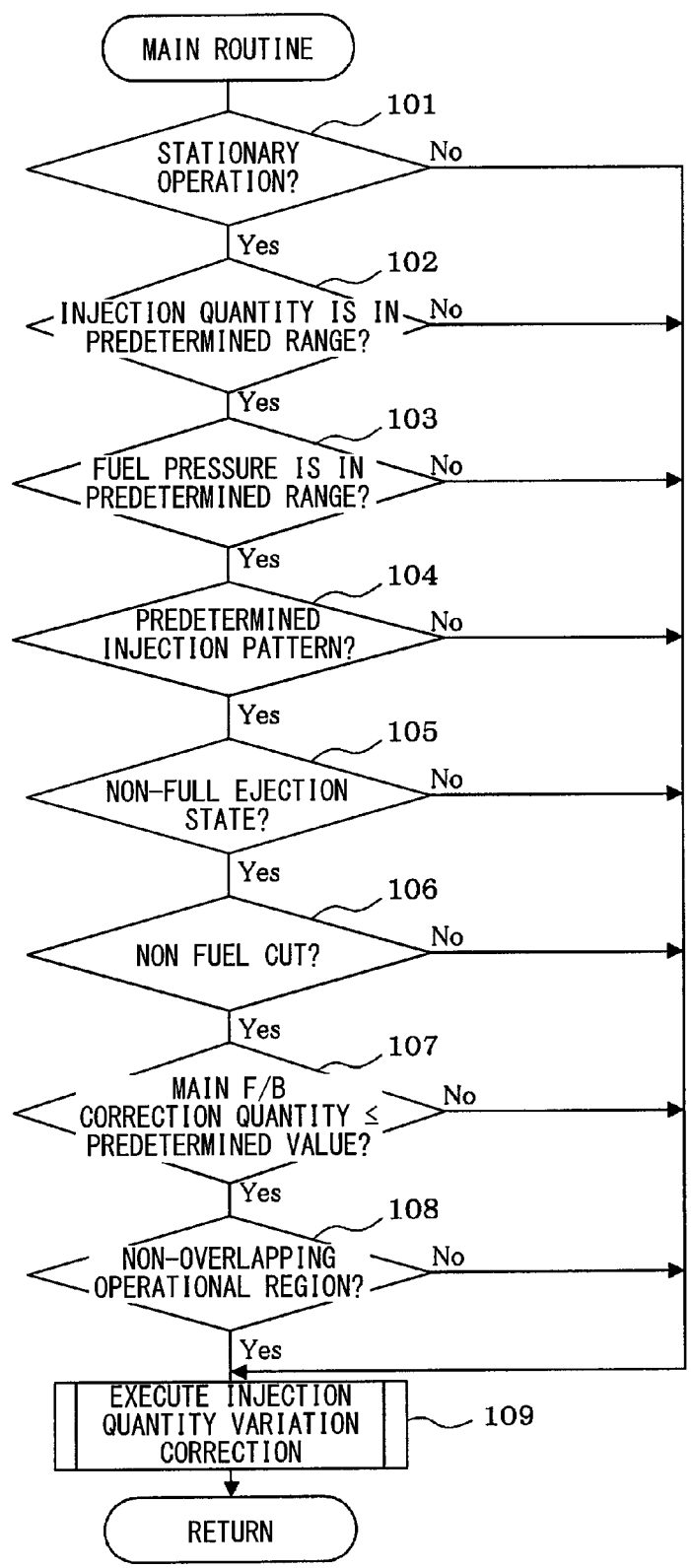
FIG. 3 is a flow chart illustrating a main routine.
Figure 4:
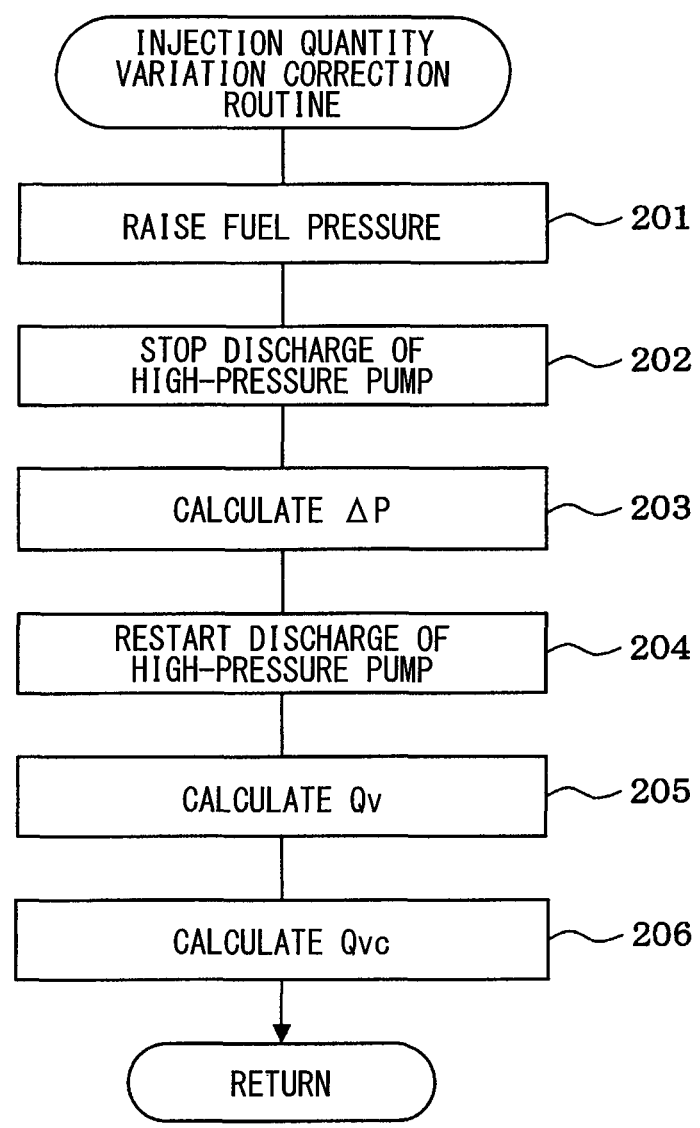
FIG. 4 is a flow chart illustrating an injection quantity variation correction routine.

Thus, in the embodiment, the ECU 38 executes each routine illustrated in FIG. 3 and FIG. 4, thereby calculating a fuel pressure decrease caused by fuel injection of the fuel injection valve 31 of each cylinder on the basis of the output of the fuel pressure sensor 32, as information on an injection quantity variation (Qv). The ECU 38 executes injection quantity variation correction to correct the injection quantity variation in the fuel injection valve 31 of each cylinder on the basis of the fuel pressure decrease caused by fuel injection of each cylinder.

Figure 2:
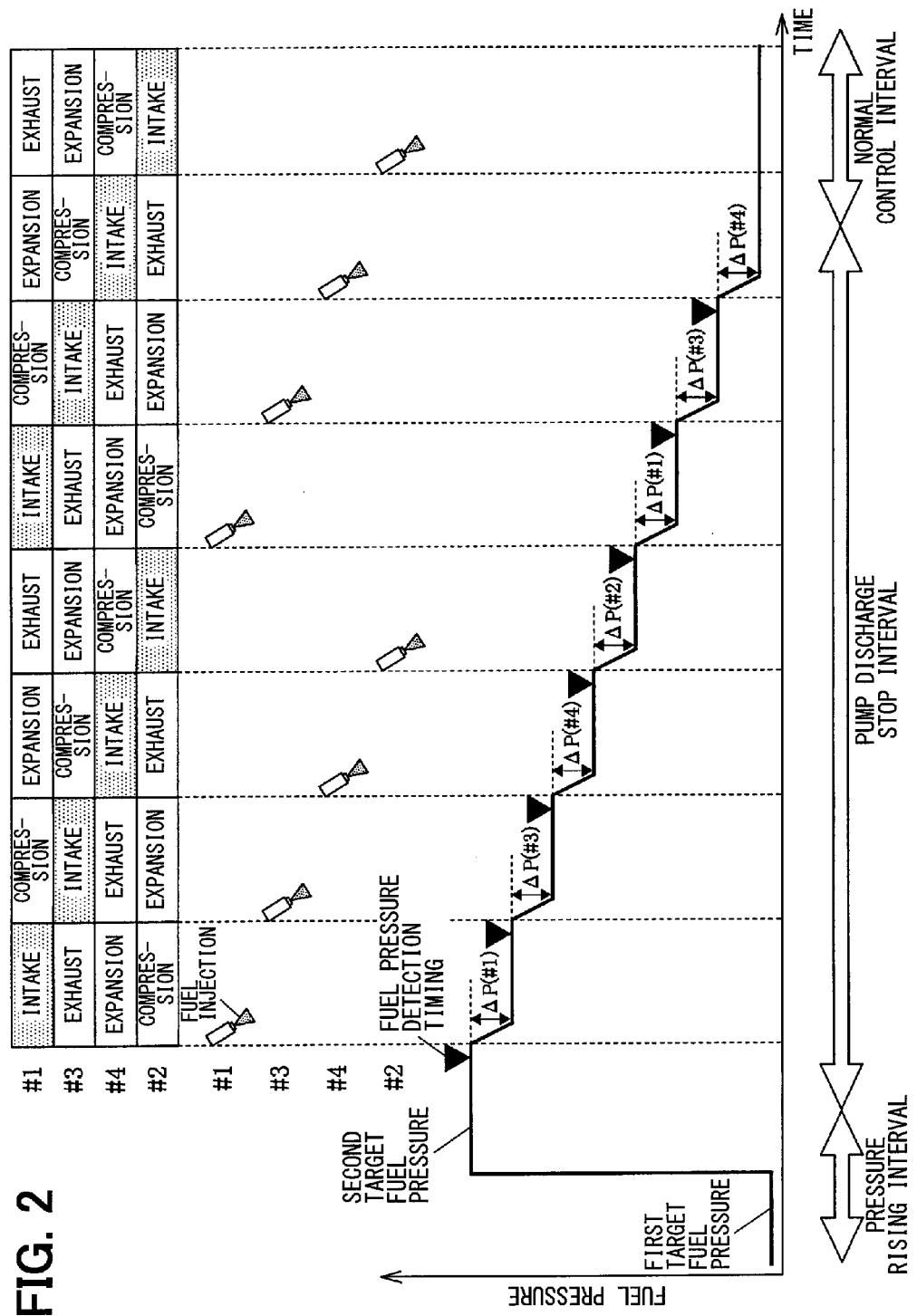
FIG. 2 is a time chart illustrating a method of calculating a fuel pressure decrease caused by a fuel injection.

Specifically, as illustrated in FIG. 2, in the injection quantity variation correction, first, the high-pressure pump 14 raises the fuel pressure from a normal target fuel pressure to a step-up target fuel pressure and then, stops injection of the high-pressure pump 14 for a predetermined period. The normal target fuel pressure is a target fuel pressure corresponding to the engine operational state, and is referred to as a first target fuel pressure. The step-up target fuel pressure is referred to as a second target fuel pressure. The predetermined period is a period during which the fuel pressure lowers from the second target fuel pressure to the first target fuel pressure, and is referred to as a pump injection stop period. During the pump injection stop period, each time fuel injection of the fuel injection valve 31 is performed, processing of calculating a fuel pressure decrease ΔP is repeated to calculate the fuel pressure decrease ΔP(#i) caused by the fuel injection of each cylinder. Here, #i refers to cylinder number, and in the case of a four-cylinder engine, i is 1 to 4.

After that, an average value of the fuel pressure decreases caused by the fuel injection of all cylinders is calculated. By calculating a deviation between the fuel pressure decrease caused by the fuel injection and the average value for each cylinder as the injection quantity variation, the injection quantity variation of the fuel injection valve 31 of each cylinder is calculated.

Then, an injection quantity variation correction quantity (Qvc) is calculated for each cylinder so as to reduce the injection quantity variation of the fuel injection valve 31. The injection pulse width (injection time) of the fuel injection valve 31 of each cylinder is corrected for each cylinder by correcting the required injection quantity using the injection quantity variation correction quantity. Thus, the injection quantity variation of the fuel injection valve 31 of each cylinder is reduced. That is, the injection quantity variation between cylinders is reduced.

During the transient operation such as acceleration or deceleration of the engine, when the required injection quantity varies with a change of the engine operational state, the injection quantity of the fuel injection valve 31 of each cylinder sequentially changes in the order of injection. Accordingly, the fuel pressure decrease caused by the fuel injection of each cylinder also changes in the order of injection. In such a case, since the fuel pressure decrease caused by the fuel injection changes due to the change of the injection quantity according to the change of the operational state, the fuel pressure decrease caused by the fuel injection of each cylinder cannot accurately reflect the injection quantity variation of each cylinder. For this reason, during the transient operation such as acceleration or deceleration of the engine, when the injection quantity variation correction to correct the injection quantity variation of the fuel injection valve 31 of each cylinder is performed based on the fuel pressure decrease caused by the fuel injection of each cylinder, the injection quantity variation of each cylinder is not be precisely corrected, which may lead to wrong correction of the injection quantity of each cylinder.

In the embodiment, the ECU 38 executes each routine illustrated in FIG. 3 and FIG. 4. Thus, during the stationary operation of the engine, the injection quantity variation correction to correct the injection quantity variation of the fuel injection valve 31 of each cylinder is performed based on the fuel pressure decrease caused by the fuel injection of each cylinder. During the stationary operation of the engine, the operational state of the engine is stationary.

During the stationary operation of the engine, the fuel pressure decrease caused by the fuel injection of each cylinder can accurately reflect the injection quantity variation of each cylinder without being affected by the change of the injection quantity due to the change of the engine operational state. Consequently, during the stationary operation of the engine, the injection quantity variation correction to correct the injection quantity variation of the fuel injection valve 31 of each cylinder is performed based on the fuel pressure decrease caused by the fuel injection of each cylinder, thereby precisely correcting the injection quantity variation of each cylinder to prevent wrong correction of the injection quantity of each cylinder.

In the injection quantity variation correction, when the injection quantity of the fuel injection valve 31 is small, the fuel pressure decrease caused by the fuel injection becomes small. As a result, a variation in an arithmetic value of the fuel pressure decrease due to arithmetic error and resolution (LSB) becomes relatively large, and a variation of the injection quantity variation becomes relatively small. When the injection quantity of the fuel injection valve 31 is too small, in comparing the fuel pressure decrease caused by the fuel injection of each cylinder, the variation of the injection quantity variation is hidden in the variation caused by arithmetic error and resolution and thus, the injection quantity variation of each cylinder cannot be precisely determined.

On the contrary, in the injection quantity variation correction, when the injection quantity of the fuel injection valve 31 is large, the fuel pressure decrease caused by the fuel injection becomes large. For this reason, when the injection quantity of the fuel injection valve 31 is too large, during the pump injection stop period following step-up of the fuel pressure, before the number of fuel injections reaches a required number of times, the fuel pressure lowers to the first target fuel pressure that is the fuel pressure prior to step-up. This may disable calculation of the fuel pressure decrease caused by the fuel injection of each cylinder. In the embodiment, the required number of times is the number of times necessary for calculating the fuel pressure decrease caused by the fuel injection of each cylinder.

Thus, in the embodiment, on the condition that the injection quantity of the fuel injection valve 31 falls within a predetermined range, the injection quantity variation correction is performed.

A lower limit of the predetermined range is set to be not less than a minimum injection quantity of the fuel injection valve 31, and be a minimum value of the injection quantity such that the variation of the injection quantity variation is not too smaller than the variation in the arithmetic value of the fuel pressure decrease due to arithmetic error and resolution, and the injection quantity variation of each cylinder can be precisely determined based on the fuel pressure decrease caused by the fuel injection of each cylinder, or a value slightly larger than the minimum value. The minimum injection quantity of the fuel injection valve 31 is a minimum value of normally-injectable injection quantity.

An upper limit of the predetermined range is set to a maximum value of the injection quantity such that, during the pump injection stop period after step-up of the fuel pressure, fuel injection can be performed required number of times before the fuel pressure lowers to the first target fuel pressure, or a value slightly smaller than the maximum value.

In such manner, during the pump injection stop period after step-up of the fuel pressure, the fuel pressure decrease caused by the fuel injection of each cylinder can be reliably calculated, and the injection quantity variation of each cylinder can be precisely determined based on the fuel pressure decrease caused by the fuel injection of each cylinder.

In the embodiment, on the condition that the fuel pressure falls within the predetermined range, the injection quantity variation correction is performed. For example, the predetermined range is set to a fuel pressure range that is not more than an upper limit of the system fuel pressure, and does not negatively affect drivability and fuel consumption. This can achieve the injection quantity variation correction without negatively affecting drivability and fuel consumption.

Further, in the embodiment, on the condition that the injection pattern of the fuel injection valve 31 is a predetermined injection pattern, the injection quantity variation correction is performed. For example, the predetermined injection pattern is an injection pattern of performing the fuel injection of the fuel injection valve 31 by using only one cylinder between fuel pressure detection timings for calculating the fuel pressure decrease caused by the fuel injection. Specifically, in the embodiment, the injection pattern is an intake stroke single injection pattern of performing the fuel injection once in the intake stroke of each cylinder.

In such a manner, the fuel pressure decrease caused by the fuel injection of the cylinder concerned can be accurately calculated without being affected by fuel pressure decrease caused by the fuel injection of other cylinders, accurately calculating the fuel pressure decrease caused by the fuel injection of each cylinder.

In the embodiment, in the injection quantity variation correction, the fuel pressure decrease caused by the fuel injection of each cylinder is calculated during the pump injection stop period after step-up of the fuel pressure. However, in a full injection state in which the high-pressure pump 14 injects a maximum injection quantity of fuel, the fuel pressure cannot be further raised. Thus, the injection quantity variation correction cannot be performed.

Thus, in the embodiment, on the condition that the injection state is a non-full injection state other than the full injection state in which the high-pressure pump 14 injects the maximum injection quantity of fuel, the injection quantity variation correction is performed. In this manner, the injection quantity variation correction can be performed when the high-pressure pump 14 is not in the full injection state, reliably achieving the injection quantity variation correction.

During a fuel cutting state in which the fuel injection valve 31 stops fuel injection, the fuel pressure decrease caused by the fuel injection cannot be calculated, disabling the injection quantity variation correction.

Thus, in the embodiment, on the condition of a non-fuel cutting state other than the fuel cutting state in which the fuel injection valve 31 stops fuel injection, the injection quantity variation correction is performed. In this manner, the injection quantity variation correction can be performed in the non-fuel cutting state, reliably performing the injection quantity variation correction.

When fuel cannot be normally injected in an insufficient state where a residual quantity of the fuel is insufficient, the fuel pressure decrease caused by the fuel injection changes and thus, the fuel pressure decrease caused by the fuel injection of each cylinder cannot accurately reflect the injection quantity variation of each cylinder. Consequently, when the injection quantity variation correction is performed, the injection quantity variation of each cylinder cannot be precisely corrected, which may lead to wrong correction of the injection quantity of each cylinder.

Thus, in the embodiment, on the condition that the main F/B correction quantity is not more than a predetermined value, the injection quantity variation correction is performed. For example, the predetermined value is set to an upper limit of a normal range of the main F/B correction quantity.

That is, when the main F/B correction quantity is larger than the predetermined value, it is determined that fuel cannot be normally injected due to the insufficient state, and the injection quantity variation correction is prohibited. On the other hand, when the main F/B correction quantity is not more than the predetermined value, it is determined that fuel can be normally injected, and the injection quantity variation correction is allowed. This can prevent the injection quantity variation correction when the fuel cannot be normally injected due to the insufficient state, preventing wrong correction of the injection quantity of each cylinder.

When the injection quantity variation correction is performed during normal control of the high-pressure pump 14, an injection period of the fuel injection valve 31 may overlap an injection period of the high-pressure pump 14 depending on the engine operational region. In the operational region where the injection period of the fuel injection valve 31 overlaps the injection period of the high-pressure pump 14, the fuel pressure decrease caused by the fuel injection of the fuel injection valve 31 cannot be accurately calculated due to step-up of the fuel pressure, which is caused by injection of fuel from the high-pressure pump 14.

Thus, in the embodiment, on the condition that the operational region is a non-overlapping operational region in which that injection period of the fuel injection valve 31 does not overlap the injection period of the high-pressure pump 14, the injection quantity variation correction is performed. In this manner, even when the injection quantity variation correction is performed during normal control of the high-pressure pump 14, the fuel pressure decrease caused by the fuel injection of the fuel injection valve 31 can be accurately calculated without being affected by step-up of the fuel pressure, which is caused by injection of fuel from the high-pressure pump 14, thereby achieving accurate calculation of the fuel pressure decrease caused by the fuel injection of each cylinder.

Contents of each routine executed by the ECU 38 in the embodiment as illustrated in FIG. 3 and FIG. 4 will be described below.

A main routine illustrated in FIG. 3 is repeatedly executed at predetermined intervals during a power ON period of the ECU 38 (ON period of an ignition switch), and functions as an injection quantity variation correction unit.

When the main routine is started, first, in 101 to 108, the ECU 38 determines whether or not execution conditions for the injection quantity variation correction are satisfied. The execution conditions for the injection quantity variation correction include following conditions (1) to (8).

For the first condition, the ECU 38 determines whether or not the engine is in the stationary operation (101).

For the second condition, the ECU 38 determines whether or not the injection quantity of the fuel injection valve 31 is in the predetermined range (102).

For the third condition, the ECU 38 determines whether or not the fuel pressure is in the predetermined range (103).

For the fourth condition, the ECU 38 determines whether or not the injection pattern of the fuel injection valve 31 is the predetermined injection pattern (104).

For the fifth condition, the ECU 38 determines whether or not the high-pressure pump 14 is in the non-full injection state (105).

For the sixth condition, the ECU 38 determines whether or not the fuel injection valve 31 does not stop fuel injection non fuel cut (106)

For the seventh condition, the ECU 38 determines whether or not the main F/B correction quantity is not more than the predetermined value (107). For the eighth condition, the ECU 38 determines whether or not the operational region is the non-overlapping operational region (108).

When all of the conditions are satisfied, the execution conditions for the injection quantity variation correction are met, and when any of the conditions is not satisfied, the execution conditions for the injection quantity variation correction are not met.

In 101 to 108, when the ECU 38 determines that the execution conditions for the injection quantity variation correction are not met, the injection quantity variation correction is prohibited to finish the main routine.

In 101 to 108, when the ECU 38 determines that the execution conditions for the injection quantity variation correction are met, the injection quantity variation correction is allowed and the flow proceeds to 109 to execute an injection quantity variation correction routine illustrated in FIG. 4.

The injection quantity variation correction routine illustrated in FIG. 4 is a subroutine executed in 109 in the main routine in FIG. 3. When the routine is started, first, in 201, the ECU 38 causes the high-pressure pump 14 to raise the fuel pressure from the first target fuel pressure to the second target fuel pressure. In 202, the ECU 38 controls the high-pressure pump 14 to stop fuel discharge.

In 203, the ECU 38 calculates the fuel pressure decrease ΔP caused by the fuel injection of the fuel injection valve 31 for each cylinder on the basis of the output of the fuel pressure sensor 32. In the embodiment, the ECU 38 sets a fuel pressure detection timing to a pump cam top, and detects the fuel pressure before start of fuel injection and after end of fuel injection of each cylinder. The pump cam top is a timing at which the piston 19 of the high-pressure pump 14 reaches the top dead center. Then, the ECU 38 calculates a difference between the fuel pressure before start of fuel injection and the fuel pressure after end of fuel injection of each cylinder, as the fuel pressure decrease caused by the fuel injection.

In 204, for example, when the fuel pressure lowers to the first target fuel pressure, the ECU 38 restarts injection of the high-pressure pump 14. In 205, the ECU 38 calculates an average value of the fuel pressure decrease caused by the fuel injection for all cylinders, and calculates, as the injection quantity variation, a deviation between the fuel pressure decrease caused by the fuel injection and the average value for each cylinder, thereby calculating the injection quantity variation of the fuel injection valve 31 of each cylinder.

In 206, the ECU 38 calculates the injection quantity variation correction quantity for each cylinder such that the injection quantity variation of the fuel injection valve 31 becomes small. The ECU 38 corrects the required injection quantity for each cylinder by using the injection quantity variation correction quantity, thereby correcting the injection pulse width of the fuel injection valve 31 for each cylinder to reduce the injection quantity variation of the fuel injection valve 31 of each cylinder. That is, the ECU 38 reduces the injection quantity variation between cylinders.

In the above-mentioned embodiment, it is determined whether or not the execution conditions for the injection quantity variation correction are met, on the basis of whether or not all of following conditions are satisfied: the engine operation is the stationary operation, the injection quantity of the fuel injection valve 31 falls within the predetermined range, and the fuel pressure falls within the predetermined range. When it is determined that the execution conditions for the injection quantity variation correction are met, the fuel pressure decrease caused by the fuel injection of the fuel injection valve 31 for each cylinder is calculated based on the output of the fuel pressure sensor 32, and the injection quantity variation correction to correct the injection quantity variation of the fuel injection valve 31 for each cylinder is performed based on the fuel pressure decrease caused by the fuel injection of each cylinder. Thus, the fuel pressure decrease caused by the fuel injection of each cylinder can be accurately calculated, precisely correcting the injection quantity variation of each cylinder to prevent wrong correction of the injection quantity of each cylinder.

The method of correcting the injection quantity variation of the fuel injection valve 31 of each cylinder on the basis of the fuel pressure decrease caused by the fuel injection of each cylinder is not limited to the method described in the embodiment, and may be modified as appropriate.

The present disclosure is not necessarily applied to only the four-cylinder engine, and may be applied to an engine having three or less cylinders and an engine having five or more cylinders. The cam 21 for driving the piston 19 of the high-pressure pump 14 is not limited to the four-ridge cam having four cam ridges, and may be a three-ridge cam having three cam ridges or a two-ridge cam, having two cam ridges.

The present disclosure may be variously modified so as not to deviate from the subject matter. For example, configuration of the high-pressure pump or the fuel supply system may be modified as appropriate.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A control device for an internal combustion engine which is applied to a system that supplies fuel injected from a high-pressure pump to a fuel injection valve of each cylinder in the internal combustion engine via a high-pressure fuel passage, the control device for the internal combustion engine comprising:

a fuel pressure sensor detecting a fuel pressure in the high-pressure fuel passage; and an injection quantity variation correction unit calculating a fuel pressure decrease caused by the fuel injection of the fuel injection valve for each cylinder on the basis of an output of the fuel pressure sensor, and executing an injection quantity variation correction to correct an injection quantity variation of the fuel injection valve for the each cylinder on the basis of the fuel pressure decrease caused by the fuel injection, wherein the injection quantity variation correction unit executes the injection quantity variation correction when an operational state of the internal combustion engine is stationary, wherein the injection quantity variation correction unit executes the injection quantity variation correction on a condition that an injection pattern of the fuel injection valve is a predetermined injection pattern;

the predetermined injection pattern is an injection pattern of performing the fuel injection of the fuel injection valve in only one cylinder between fuel pressure detection timings for calculating the fuel pressure decrease caused by the fuel injection, the injection quantity variation correction unit executes the injection quantity variation correction on a condition that an injection period of the fuel injection valve does not overlap an injection period of the high-pressure pump in an operational region; and the injection quantity variation correction unit stops an injection of the high pressure pump for a predetermined period after the high-pressure pump raises the fuel pressure from a normal target fuel pressure to a set-up target fuel pressure.

2. The control device for the internal combustion engine according to claim 1, wherein
the injection quantity variation correction unit executes the injection quantity variation correction on a condition that the injection quantity of the fuel injection valve falls within a predetermined range.

3. The control device for the internal combustion engine according to claim 1, wherein
the injection quantity variation correction unit executes the injection quantity variation correction on a condition that the fuel pressure falls within a predetermined range.

4. The control device for the internal combustion engine according to claim 1, wherein
the injection quantity variation correction unit executes the injection quantity variation correction on a condition that an injection state is not a full injection state in which the high-pressure pump injects a maximum injection quantity of fuel.

5. The control device for the internal combustion engine according to claim 1, wherein
the injection quantity variation correction unit executes the injection quantity variation correction on a condition that the fuel injection valve does not stop fuel injection.

6. The control device for the internal combustion engine according to claim 1, wherein
the injection quantity variation correction unit executes the injection quantity variation correction on a condition that an air-to-fuel ratio feedback control correction quantity to correct the injection quantity of the fuel injection valve such that an air-to-fuel ratio of exhaust gas of the internal combustion engine matches a target air-to-fuel ratio is not more than a predetermined value.

7. The control device for the internal combustion engine according to claim 1, wherein
the injection pattern is an intake stroke single injection pattern of performing the fuel injection once in an intake stroke of each cylinder.

8. The control device for the internal combustion engine according to claim 1, wherein
the injection quantity variation correction unit corrects the required injection quantity for each cylinder by using an injection quantity variation correction quantity, and corrects an injection pulse width of the fuel injection valve for each cylinder to reduce the injection quantity variation of the fuel injection valve of each cylinder.

9. A controller for an internal combustion engine which is applied to a system that supplies fuel injected from a high-pressure pump to a fuel injection valve of each cylinder in the internal combustion engine via a high-pressure fuel passage, the controller for the internal combustion engine comprising:
a fuel pressure sensor detecting a fuel pressure in the high-pressure fuel passage; and
a computer configured at least to:
calculate a fuel pressure decrease caused by the fuel injection of the fuel injection valve for each cylinder on the basis of an output of the fuel pressure sensor, and
execute an injection quantity variation correction to correct an injection quantity variation of the fuel injection valve for the each cylinder on the basis of the fuel pressure decrease caused by the fuel injection, wherein
the injection quantity variation correction is executed by the computer when an operational state of the internal combustion engine is stationary;
the injection quantity variation correction is executed by the computer on a condition that an injection pattern of the fuel injection valve is a predetermined injection pattern;
the predetermined injection pattern is an injection pattern of performing the fuel injection of the fuel injection valve in only one cylinder between fuel pressure detection timings for calculating the fuel pressure decrease caused by the fuel injection;
the injection quantity variation correction is executed by the computer on a condition that an injection period of the fuel injection valve does not overlap an injection period of the high-pressure pump in an operational region, and
the injection quantity variation correction includes stopping an injection of the high pressure pump for a predetermined period after the high-pressure pump raises the fuel pressure from a normal target fuel pressure to a set-up target fuel pressure.

10. The controller for the internal combustion engine according to claim 9, wherein
the injection quantity variation correction is executed by the computer on a condition that the injection quantity of the fuel injection valve falls within a predetermined range.

11. The controller for the internal combustion engine according to claim 9, wherein
the injection quantity variation correction is executed by the computer on a condition that the fuel pressure falls within a predetermined range.

12. The controller for the internal combustion engine according to claim 9, wherein the injection quantity variation correction is executed by the computer on a condition that an injection state is not a full injection state in which the high-pressure pump injects a maximum injection quantity of fuel.

13. The controller for the internal combustion engine according to claim 9, wherein
the injection quantity variation correction is executed by the computer on a condition that the fuel injection valve does not stop fuel injection.

14. The controller for the internal combustion engine according to claim 9, wherein
the injection quantity variation correction is executed by the computer on a condition that an air-to-fuel ratio feedback control correction quantity to correct the injection quantity of the fuel injection valve such that an air-to-fuel ratio of exhaust gas of the internal combustion engine matches a target air-to-fuel ratio is not more than a predetermined value.

15. The controller for the internal combustion engine according to claim 9, wherein
the injection pattern is an intake stroke single injection pattern of performing the fuel injection once in an intake stroke of each cylinder.

16. The controller for the internal combustion engine according to claim 9, wherein
the required injection quantity is executed by the computer for each cylinder by using an injection quantity variation correction quantity, and an injection pulse width of the fuel injection valve is corrected by the computer for each cylinder to reduce the injection quantity variation of the fuel injection valve of each cylinder.

17. The controller for the internal combustion engine according to claim 1, wherein
the normal target fuel pressure is a target fuel pressure corresponding to an engine operational state.

18. The controller for the internal combustion engine according to claim 9, wherein
the normal target fuel pressure is a target fuel pressure corresponding to an engine operational state.

19. The controller for the internal combustion engine according to claim 1, wherein the predetermined period is a period during which the fuel pressure lowers from the step-up target fuel pressure to the normal target fuel pressure.

20. The controller for the internal combustion engine according to claim 9, wherein the predetermined period is a period during which the fuel pressure lowers from the step-up target fuel pressure to the normal target fuel pressure.

* * * * *